(12) United States Patent
Khasnabish et al.

(10) Patent No.: US 8,670,312 B2
(45) Date of Patent: *Mar. 11, 2014

(54) METHOD, COMPUTER PROGRAM PRODUCT, AND APPARATUS FOR PROVIDING A DISTRIBUTED ROUTER ARCHITECTURE

(75) Inventors: Bhumip Khasnabish, Lexington, MA (US); Takkin G. Yum, Briarcliff, NY (US); David C. Wang, Coppell, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/493,037

(22) Filed: Jun. 11, 2012

(65) Prior Publication Data

US 2012/0250681 A1    Oct. 4, 2012

Related U.S. Application Data

(63) Continuation of application No. 12/645,336, filed on Dec. 22, 2009, now Pat. No. 8,208,376, which is a continuation of application No. 11/614,643, filed on Dec. 21, 2006, now Pat. No. 7,656,797.

(51) Int. Cl.
    *H04L 12/26*      (2006.01)

(52) U.S. Cl.
    USPC .......................................... 370/230; 370/232

(58) Field of Classification Search
    USPC ................................................. 370/230, 232
    See application file for complete search history.

(56) References Cited

U.S. PATENT DOCUMENTS

| | | | |
|---|---|---|---|
| 7,656,797 B2 * | 2/2010 | Khasnabish et al. | 370/230 |
| 2003/0099237 A1 * | 5/2003 | Mitra et al. | 370/393 |
| 2004/0117476 A1 * | 6/2004 | Steele et al. | 709/224 |
| 2005/0137998 A1 * | 6/2005 | Betts et al. | 707/1 |

* cited by examiner

*Primary Examiner* — Melvin Marcelo

(57) ABSTRACT

An apparatus for providing distributed router architecture includes a processing element and a resource availability element. The processing element may be configured to receive indications of receipt of data associated with a service for routing to a destination address. The resource availability element may be in communication with the processing element and may be configured to monitor resource usage over a plurality of distributed resource planes. The processing element may be further configured to allocate a resource associated with routing the data based on the monitored resource usage.

16 Claims, 4 Drawing Sheets

METHOD, COMPUTER PROGRAM PRODUCT, AND APPARATUS FOR PROVIDING A DISTRIBUTED ROUTER ARCHITECTURE

RELATED APPLICATIONS

This application is a continuation of U.S. patent application Ser. No. 12/645,336, filed on Dec. 22, 2009, by Bhumip Khasnabish et al., entitled METHOD, COMPUTER PROGRAM PRODUCT, AND APPARATUS FOR PROVIDING A DISTRIBUTED ROUTER ARCHITECTURE, which is a continuation of U.S. patent application Ser. No. 11/614,643, now U.S. Pat. No. 7,656,797, by Bhumip Khasnabish et al., filed Dec. 21, 2006 entitled METHOD, COMPUTER PROGRAM PRODUCT, AND APPARATUS FOR PROVIDING A DISTRIBUTED ROUTER ARCHITECTURE, the contents of which are hereby incorporated by reference in their entirety.

BACKGROUND INFORMATION

Routers are well known computer network devices that forward data packets across a network toward their destinations. In this regard, a typical router passes logically addressed packets from their source toward their destination through intermediary nodes. Often a router performs its function of routing packets based on routing tables, which may be either simple or complex based on the complexity of the network in which the router operates. Since routers often join two networks together, it is becoming increasingly common for individual homes, businesses or other entities to utilize routers to connect local area networks (LANs) to the Internet.

However, current routers primarily support routing between input and output functions. In other words, the resources of a particular router are useable only by the particular router since layers of the router are tightly coupled within a particular chassis. As such, current routers are unitary in their architecture and therefore do not support geo-resiliency, resource sharing and common application elements. Thus, a first router in a particular location which is receiving large demands for its resources may become constrained in its ability to provide services within the particular location, while a second router in a nearby location which is receiving lower demand for its resources may not be able to provide any routing assistance to the first router.

Although the generic term router is used above, concepts described herein may be applied equally to both core and edge routers, for example.

BRIEF DESCRIPTION OF THE SEVERAL VIEWS OF THE DRAWING(S)

DETAILED DESCRIPTION OF PREFERRED EMBODIMENTS

Figure 1:
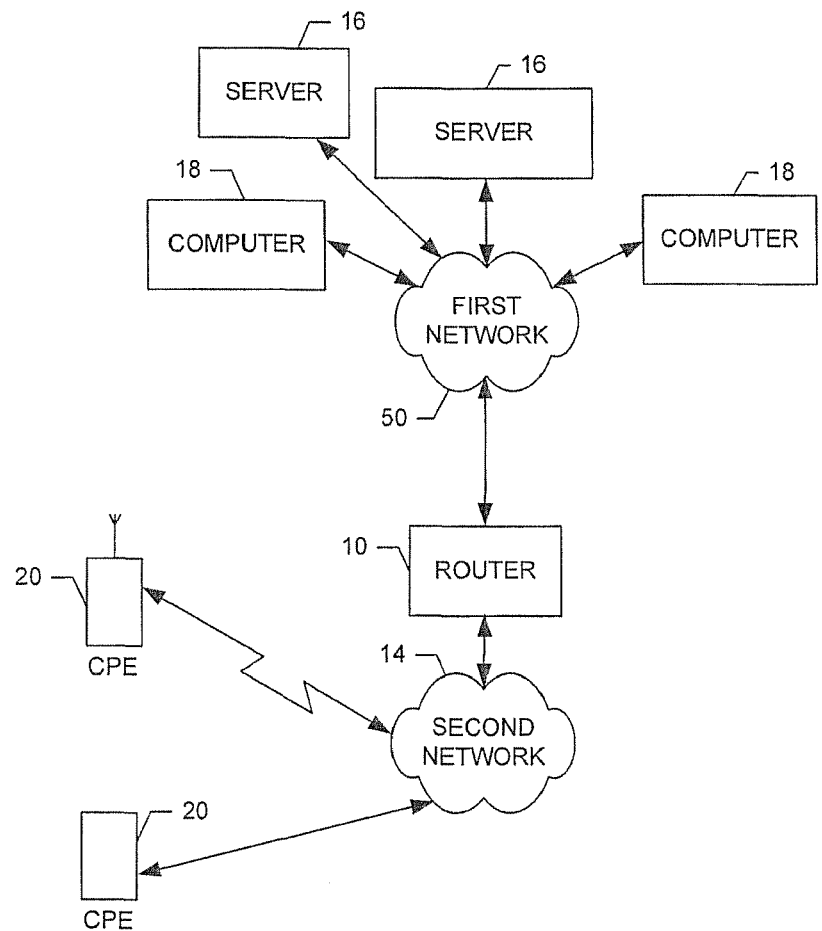
FIG. 1 illustrates a block diagram of a network that may benefit from an embodiment of the present invention.

Exemplary embodiments are described hereinafter with reference to the accompanying drawings, in which exemplary embodiments and examples are shown. Like numbers refer to like elements throughout.

One or more embodiments may be implemented as a method, a device, or a computer program product. Accordingly, an embodiment may take the form of an entirely hardware embodiment, an entirely software embodiment, or an embodiment combining software and hardware aspects. Furthermore, implementations of an embodiment may take the form of a computer program product including a computer-readable storage medium having computer-readable program instructions (e.g., computer software) embodied in the storage medium. More particularly, implementations of certain embodiments may take the form of web-implemented computer software. Any suitable computer-readable storage medium may be utilized including hard disks, CD-ROMs, optical storage devices, or magnetic storage devices.

Embodiments are described below with reference to block diagrams and flowchart illustrations of methods, devices, systems, and computer program products. It is understood that each block of the block diagrams and flowchart illustrations, and combinations of blocks in the block diagrams and flowchart illustrations, respectively, can be implemented as a computer program product or more specifically by one or more executable portions of the computer program product. The computer program product may be loaded onto a general purpose computer, special purpose computer, or other programmable data processing apparatus to produce a machine, such that the executable portions of the computer program product are executed on the computer or other programmable data processing apparatus and create a means for implementing the functions specified in the flowchart block or blocks.

The computer program product may also be stored in a computer-readable memory that can direct a computer or other programmable data processing apparatus to function in a particular manner, such that the computer program product stored in the computer-readable memory produces an article of manufacture including the executable portions of the computer program product for implementing the one or more functions specified in the flowchart block or blocks. The computer program product may also be loaded onto a computer or other programmable data processing apparatus to cause a series of operations to be performed on the computer or other programmable apparatus to produce a computer-implemented process such that the executable portions execute on the computer or other programmable apparatus for implementing the functions specified in the flowchart block or blocks.

Accordingly, blocks of the block diagrams and flowchart illustrations support combinations of means for performing the specified functions and program instruction means for performing the specified functions. It is also understood that each block of the block diagrams and flowchart illustrations, and combinations of blocks in the block diagrams and flowchart illustrations, can be implemented by special purpose hardware-based computer systems that perform the specified functions or combinations of special purpose hardware and computer instructions.

In certain embodiments referenced herein, a "computer" or "computing device" may be described. Such a computer may be, for example, a mainframe, server, desktop, laptop, or a hand held device such as a data acquisition and storage device, or it may be a processing device embodied within another apparatus such as, for example, a set top box for a television system or a wireless telephone. In some instances the computer may be a "dumb" terminal used to access data or processors over a network.

In certain embodiments referenced herein, a "network" or "network system" may be referenced. Such a network may be considered for example, a personal area network (PAN), a local area network (LAN), a wide area network (WAN), the Internet, etc. Such networks may include one or more devices, such as computers and peripheral devices. The networks may be configured to communicate with one or more external devices, systems, networks, or other sources through one or more interfaces. More specifically, one or more of the computers or peripheral devices may be configured to receive and/or transmit information to or through an external device, system, network, or other external source.

For example, and as shown in FIG. 1, a router 10 may be disposed in communication with a first network 12 (e.g., the internet) and a second network 14 (e.g., a legacy network). Accordingly, in this exemplary embodiment, the router 10 may be considered an edge router. However, it should be noted that although the router 10 is described in this exemplary embodiment as being an edge router, the router 10 could alternatively be embodied as a core or backbone router. The first network 12 may include one or more core or backbone routers, which may be in communication with one or more servers 16 or computers 18. The second network 14 could be, for example, a public switched telephone network (PSTN), a wireless network, a private packet switched network, or various other types of networks in communication with customer premises equipment (CPE) 20 and/or various other types of fixed and/or mobile communication terminals. As such, the router 10 could be utilized for routing packet data related to numerous types of services from devices associated with the first network 12 to devices (e.g., the CPE 20) associated with the second network 14. Some examples of such services may include Voice over Internet Protocol (VoIP), Internet access, asymmetric digital subscriber line (ADSL) services, etc.

Although FIG. 1 only shows a single router 10, it should be understood that a plurality of routers may be utilized to provide routing services between various different networks. Additionally, one or more CPE 20 devices may be associated with a particular router and various other CPEs, computers, servers or other communication devices may be in communication with one or more other routers each of which may employ embodiments described herein. In this regard, the second network 14 may be geographically specific in that the second network 14 or the CPE 20 in communication with the router 10 may be associated with a specific location. For example, the second network 14 could be a LAN associated with one office of a particular company and the CPE 20 could include mobile or fixed devices such as laptop computers, PCs, PDAs, cellular phones, etc. associated with the LAN. Meanwhile other routers may be associated with other CPE in another location. However, as will be explained in greater detail below, embodiments may provide for the virtualization of at least a portion of the router 10, such that although portions of the router 10 may be physically located proximate to the specific location, other portions of the router 10 may be distributed amongst various locations by virtue of the fact that such portions may physically be disposed in another location but accessible (and therefore virtually located) at the specific location. The virtualization of at least a portion of the router 10 may be accomplished by providing an interconnection between corresponding portions of routers disposed in various physical locations, and furthermore providing a mechanism by which the corresponding portions may be allocated amongst the various physical locations, such as in a dynamic way, based upon the routing traffic at each of the various physical locations.

In other words, although a chassis including hardware and/or software that at least partially defines the router 10 may be physically located in a particular location, only portions of the elements of the router 10 may be co-located at the particular location so as to be tightly coupled to each other with respect to input and/or output functions performed at the router 10 for data communicated to and/or from the particular location. Remaining portions of the router 10 may be provided via interconnections with other routers which mayor may not be in other locations, for example, in a manner to form a grid to enable the sharing of those portions of the router elements that are distributed. As such, the remaining portions of the router 10 are not co-located, but are provided from geographically diverse locations associated with other router chassis.

Figure 2:
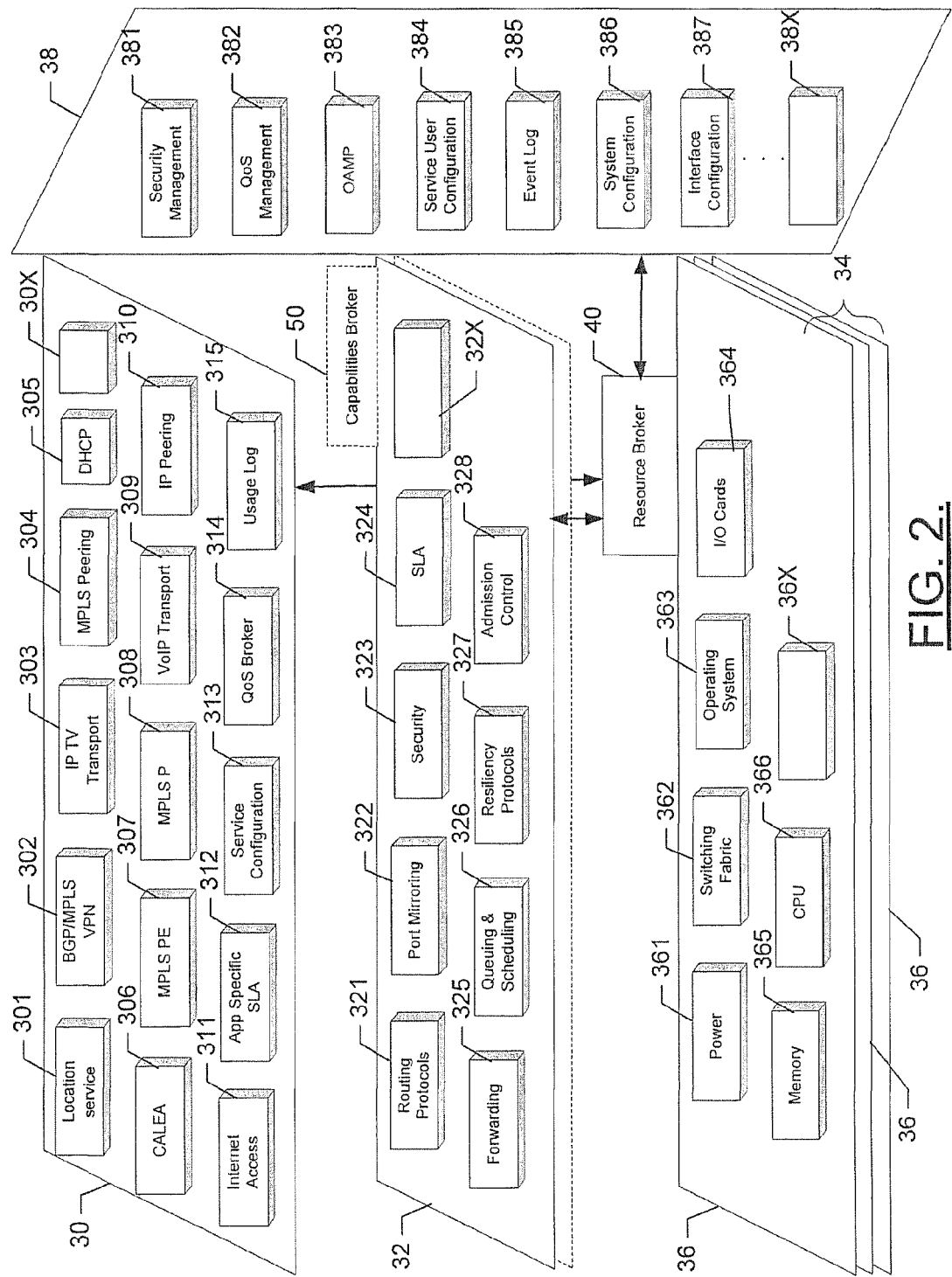
FIG. 2 is a schematic block diagram of a router illustrating a functional architecture of the router according to an exemplary embodiment of the present invention.

FIG. 2 is a schematic block diagram of the router 10 illustrating a functional architecture of the router 10 according to an exemplary embodiment of the present invention. As shown in FIG. 2, the router 10 may be virtualized such that elements associated with the router 10 may be divided amongst various planes. At least one of the planes may include elements which may be considered virtual insofar as such elements may not physically exist in their entirety at the geographic location of the router 10. Rather, elements of at least one of the planes may be geographically distributed. The geographic distribution of such elements will be described in greater detail below in reference to FIG. 3.

Referring now to FIG. 2, the router 10 may include an application and services plane 30 into which various elements associated with applications and/or services which are supported by the router 10 are organized, a common capabilities plane 32 into which various elements for supporting capabilities of the router 10 are organized, a common resource grid 34 which may include a plurality of resource planes 36 into which various resource elements that are common to each router are organized, and a management plane 38 in communication with each of the application and services, common capabilities and resource planes 30, 32 and 36. However, the router 10 may have more or different planes and/or may be organized in different manners in other embodiments. It should be noted that, in addition to the exemplary elements shown in FIG. 2, the application and services plane 30, the common capabilities plane 32, the resource planes 36 and the management plane 38 may each include any number of additional elements corresponding to additional features and services as indicated by empty blocks 30X, 32X, 36X and 38X, respectively.

As shown in FIG. 2, the application and services plane 30 may include a plurality of elements, applications or service modules each of which may be any device or means embodied in either hardware, software, or a combination of hardware and software capable of performing functions associated with the provision of the corresponding service or application. Examples of applications and services are provided in FIG. 2, and may include a location service element 301, a border gateway protocol/multiprotocol label switching virtual private network (BGP/MPLSVPN) element 302, an IP TV transport element 303, an MPLS peering element 304, a dynamic host configuration protocol (DHCP) element 305, a communications assistance for law enforcement act (CALEA) element 306, a MPLS PE (provider edge) element 307, a MPLS P (provider) element 308, a VoIP transport element 309, an IP peering element 310, an Internet access element 311, an application specific service level agreement (SLA) element 312, a service configuration element 313, a quality of service (QoS) broker 314, a usage log 315, etc. However, it should be noted that the exemplary applications and services displayed in FIG. 2 should not be considered as limiting since any application and/or service could be included as an element in the application and services plane 30, while those exemplary applications and services shown in FIG. 2 need not necessarily be included.

The common capabilities plane 32 may include a plurality of elements for performing functions associated with the router 10, each of which may be any device or means embodied in either hardware, software, or a combination of hardware and software capable of performing the functions of the corresponding element. Examples of common capabilities elements are provided in FIG. 2, and may include a routing protocol element 321, a port mirroring element 322, a security element 323, an SLA element 324, a forwarding element 325, a queuing and scheduling element 326, a resiliency protocols element 327, an admission control element 328, etc. However, it should be noted that the exemplary common capabilities elements displayed in FIG. 2 should not be considered as limiting since any other capability could also be included as an element in the common capabilities plane 32, while those exemplary common capabilities elements shown in FIG. 2 need not necessarily be included.

The resource plane 36 may include a plurality of elements each of which may correspond to one of various resources that are common to each router. Each of the elements of the resource plane 36 may be any device or means embodied in either hardware, software, or a combination of hardware and software capable of providing the corresponding resource. Examples of resources provided in FIG. 2 may include a power element 361, a switching fabric element 362, an operating system 363, input/output (I/O) cards 364, memory 365, a central processing unit (CPU) 366 or processing element, etc. However, it should be noted that the exemplary resource elements displayed in FIG. 2 should not be considered as limiting since any other resources could also be included in the resource plane 32. In an exemplary embodiment, the resource plane 36 may include a bundle of computers having the ability to execute applications or executable code portions stored in the memory 365 by virtue of the processing element 366.

The management plane 38 may include a plurality of elements each of which may correspond to one of various aspects associated with managing the applications, capabilities and resources of the router 10. Each of the elements of the management plane 38 may be any device or means embodied in either hardware, software, or a combination of hardware and software capable of providing management functions associated with each routing function request received at the router 10. In other words, when the router 10 receives a request (e.g., data to be routed by the router 10), for example, from the CPE 20 for provision of a particular service, the router 10 provides the service pursuant to the allocation of respective service elements, capabilities elements and resource elements as directed by the management plane 38. For example, if the CPE 20 requests routing associated with VoIP transport, the management plane 38 may line up or otherwise requisition the VoIP transport element 309 of the application and services plane 30, the security element 323 and the SLA element 324 of the common capabilities plane 32 and sufficient power, processing, memory, and switching resources from corresponding resource elements of the resource planes of the common resource grid 34. Examples of elements of the management plane 38 provided in FIG. 2 may include a security management element 381, a QoS management element 382, an operations, administration, maintenance and provisioning (OAMP) element 383, a service user configuration element 384, an event log 385, a system configuration element 386, an interface configuration element 387, etc. However, it should be noted that the exemplary management elements displayed in FIG. 2 should not be considered as limiting since any other management elements could also be included in the management plane 38, while those exemplary management elements shown in FIG. 2 need not necessarily be included.

As used below, the term request should be construed to include any submission of a data packet to the router 10 for routing services. As stated above, in response to a request for routing data associated with the provision of a particular service, the management plane 38 operates to coordinate requisition of corresponding elements of the application and services, common capabilities and resource planes 30, 32 and 36 for meeting the request. However, in an exemplary embodiment, if a request is received in a particular location, the router 10 may select application elements and capability elements from the particular location while the resources may be provided from one or more other locations (including portions of the resources requisitioned being provided from each of various locations) in addition to, or instead of, resources physically located at the particular location. Thus, if the router 10 is disposed in a particular location in which memory and/or processing capabilities are at/or near limits associated with the power and CPU elements of the corresponding resource plane 36, resources may be requisitioned from other locations in order to meet the memory and/or processing capability usage forecast for use or currently in use in association with routing data according to the request. Alternatively or additionally, if the router 10 is disposed in a particular location in which a particular resource of the corresponding resource plane 36 is not offered, resources may be requisitioned from other locations in order to meet the resource usage forecast for use or currently in use in association with routing data according to the request. In order to provide such functionality, the router 10 may further include a resource broker 40 which provides an interface between the resource planes 36 of the common resource grid 34 and the application and services plane 30 and the common capabilities plane 32 (i.e., upper planes) of the respective router.

Figure 3:
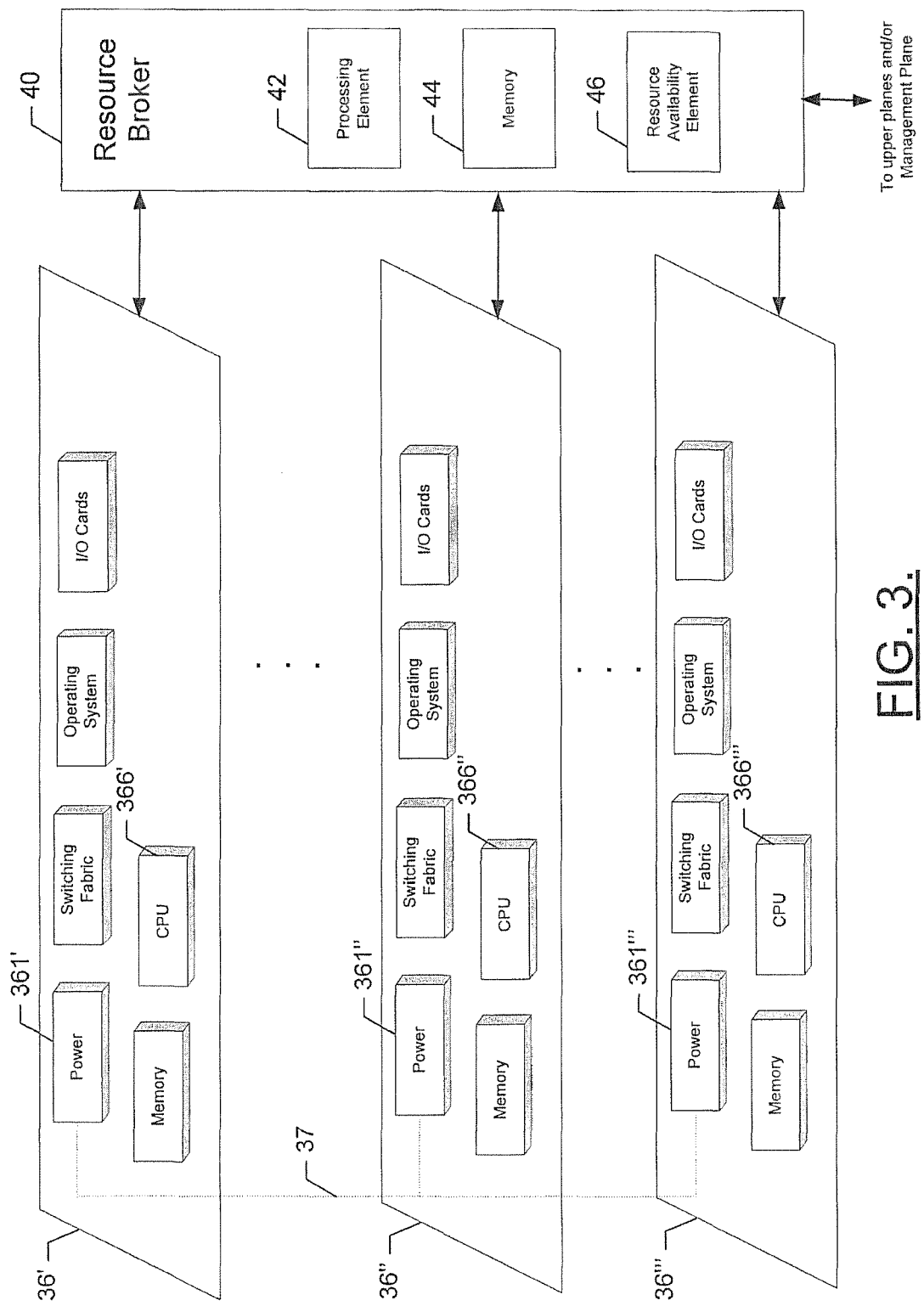
FIG. 3 is a schematic block diagram of distributed planes of a resource grid of the router according to an exemplary embodiment of the present invention.

The resource broker 40, according to an exemplary embodiment, is described in greater detail with reference to FIG. 3 which is a schematic block diagram of distributed planes of a resource grid of the router 10 according to an exemplary embodiment. As shown in FIG. 3, each of various different resource planes 36 may be in communication with the resource broker 40 even though each or at least some of the resource planes are physically located at other routers remote from the router 10 and the resource broker 40. The resource broker 40 may also be in communication with the upper planes and the management plane 38. The resource broker 40 may be any device or means embodied in either hardware, software, or a combination of hardware and software capable of monitoring and controlling the allocation of resources between all of the resource planes 36. As such, the resource broker 40 may be configured to enable resource negotiation, for example, including preference considerations across one or more levels or planes and selection (e.g., bundling) of corresponding resources, capabilities and/or applications and services. In an exemplary embodiment, the resource broker 40 may be configured to perform resource allocations based, for example, on a service class or traffic class information. In this regard, the resource broker 40 may be configured to enable resource allocations based on actual traffic and/or based on QoS classes and/or codes in addition to or as an alternative to resource allocations based upon type of service (e.g., VoIP, video, etc.). In an exemplary embodiment, the resource broker 40 may include a processing element 42, a memory 44, and a resource availability element 46. The processing element 42 may be embodied in many ways. For example, the processing element 42 may be embodied as a processor, a coprocessor, a controller or various other processing means or devices including integrated circuits such as, for example, an ASIC (application specific integrated circuit). In an exemplary embodiment, the processing element 42 and the memory 44 could be embodied in a distinct computer which may be in communication with a software agent running in all of the resource planes 36 in order to receive reports from each software agent regarding resource consumption and/or availability for communication to the resource availability element 46. Alternatively, the processing element 42 and the memory 44 could be embodied in a virtual entity comprising portions of the processing and memory elements of one, some or each of the resource planes 36.

The resource availability element 46 may be any device or means embodied in either hardware, software, or a combination of hardware and software capable of monitoring or receiving information related to resource availability and/or consumption from each of the resource planes 36. Thus, as shown in FIG. 3, the common resource grid 34 of one example may include, among others, a first resource plane 36' (e.g., physically located in New York), a second resource plane 36" (e.g., physically located in Chicago) and a third resource plane 36''' (e.g., physically located in San Francisco) each of which may be monitored for or otherwise provide information to the resource availability element 46 indicative of either resource consumption or resource availability for each resource element of the corresponding resource plane. Accordingly, as can be seen from FIG. 3, the resource planes 36 may be geographically distributed via interconnections between each corresponding resource element in each of the various resource planes 36. Although, the common resource grid 34 may include geographically distributed resources which may be, for example, distributed in a grid fashion, the resource availability element 46 may be configured to determine availability with respect to each resource element in a particular resource plane throughout the common resource grid 34. The resource availability element 46 may also be configured to communicate availability information related to any or all of the resources elements of a particular resource plane 36 to the processing element 42. The processing element may be configured to execute resource management by allocating resources between the various resource planes 36 in response to resource availability information received from the resource availability element 46. In other words, for example, interconnections may be provided between power resources (and each other resource element) at each separate resource plane 36, such that power resources (and each other resource element) at the first resource plane 36' may be shared with the second resource plane 36" and/or the third resource plane 36''' responsive to instructions from the processing element 42.

In an exemplary embodiment, for example, the router 10 may be physically located in New York and may receive a request for a particular service which is expected to require 10% of the total power capability of the power element 361' of the first resource plane 36' and 25% of the processing capability of the CPU 366' of the first resource plane 36'. Furthermore, the resource broker 40 may have received information from each of the resource planes 36 such that the resource availability element 46 indicates that the power available at the power element 361' of the first resource plane 36' is 12% (i.e., power consumption is 88%) and the processing capability available at the CPU 366' of the first resource plane 36' is 8% (i.e., 92% of the processing capability is allocated to other processes), that the power available at the power element 361" of the second resource plane 36" is 20% and the processing capability available at the CPU 366" of the second resource plane 36" is 15%, and that the power available at the power element 361''' of the third resource plane 36''' is 15% and the processing capability available at the CPU 366" of the third resource plane 36''' is 15%. Accordingly, the processing element 42 may be configured to allocate all of the power associated with the request (i.e., 10%) to the first resource plane 36' thereby increasing the power consumption of the first resource plane 36' to 98%. Meanwhile, the processing element may allocate 8% of the processing associated with the request to the first resource plane 36' thereby increasing the power consumption for the first resource plane 36' to 100%, allocate 15% of the processing associated with the request to the second resource plane 36" thereby increasing the power consumption for the second resource plane 36" to 100% and allocate 2% of the processing associated with the request to the third resource plane 36''' thereby increasing the power consumption for the third resource plane 36''' to 87%. In this regard, the processing element 42 may be configured to utilize predefined allocation rules for making decisions regarding the allocation of resources between resource planes 36. For example, the processing element 42 may be configured to transfer resources from a geographically closest resource plane on the grid. Alternatively, the processing element 42 may be configured to transfer resources from a resource plane having a relatively highest amount of resource availability. As yet another alternative, the processing element 42 may be configured to transfer resources between resource planes to achieve an average level of resource consumption between all or a portion (which may be defined geographically) of the resource planes. The processing element 42 could alternatively be configured to transfer resources between resource planes to keep each (or certain ones) of the resource planes at a resource availability above a predefined threshold. Moreover, the processing element 42 could be configured to provide prioritized allocation of resources based on a priority assigned to a type of traffic associated with packets communicated via the router 10. For example, packets associated with emergency communications may receive a higher priority for service allocation. Alternatively or additionally, a network operator may define priorities for each type of data that may be communicated via the router 10, and the router 10 may requisition resources for routing the data based upon the priority as determined by the processing element 42.

As shown by the dotted line 37 of FIG. 3, power modules of each of the resource planes 36 are interconnected. Similar interconnection may also be provided for each other corresponding element of the resource planes 36. As stated above, in an exemplary embodiment, the interconnection may form a grid of geographically distributed resource elements thereby virtualizing the resource plane of the router 10.

In an exemplary embodiment, the resource broker 40 may be configured to allocate resources dynamically. In other words, while processing a particular request utilizing resources based upon an allocation performed by the resource broker 40, the resource broker 40 may change the allocation during the processing of the request. Accordingly, the resource broker 40 may be configured to support simultaneous delivery of multiple services since the router 10 can support different services from the application and services plane 30 utilizing different capabilities from the common capabilities plane 32, without concern for resource limitations due to the fact that the resources can be supplied from anywhere on the common resource grid 34. Because the resources are often the limiting factor with respect to handling data routing functions, having the ability to distribute resources by virtualizing portions of the router 10, represents a significant improvement in router architecture. Thus, although a request originating in a particular location may be processed by a router having a chassis physically located in the particular location, at least some of the resources associated with the chassis may be virtualized by interconnections with other chassis.

It should also be noted that although FIGS. 2 and 3 have been used to describe an exemplary embodiment in which the resource broker 40 allocates resources which are distributed in a grid fashion to provide geo-resiliency with respect to resources of the resource plane, other embodiments may alternatively or additionally geographically distribute capabilities of the common capabilities plane 32. As such, an embodiment may include a capabilities broker 50 (shown in dashed lines), which may be in communication with geographically distributed capabilities planes of a capabilities grid. Operation of the capabilities broker 50 may be substantially similar to that of the resource broker 40 except that capabilities are managed and monitored instead of resources.

Accordingly, although the applications supported by different routers may vary, resources, and capabilities may be common across many different routers. Thus, efficiency of routing operations throughout a network or system may be improved by the sharing of common resources and/or common capabilities utilizing a distributed or common grid architecture as described herein.

Other characteristics of embodiments of the router 10 may include that the router 10 is configured to be stable. In this regard, the router 10 may support hitless software and hardware upgrades such that patches or other software changes may be performed without interruption of service provided by the router 10. Additionally, the router 10 may be configured to support a variety of sets of services, such as VoIP, conferencing, internet data, private data, interactive video, broadcast video, interactive gaming, distance learning, etc. via software upgrade. The router 10 may also be configured to connect to multiple domains for support of execution of multiple routing protocols for each domain. Accordingly, the router 10 may provide dynamic (e.g., session based) control of address translation for inter-IP address domain communications.

Figure 4:
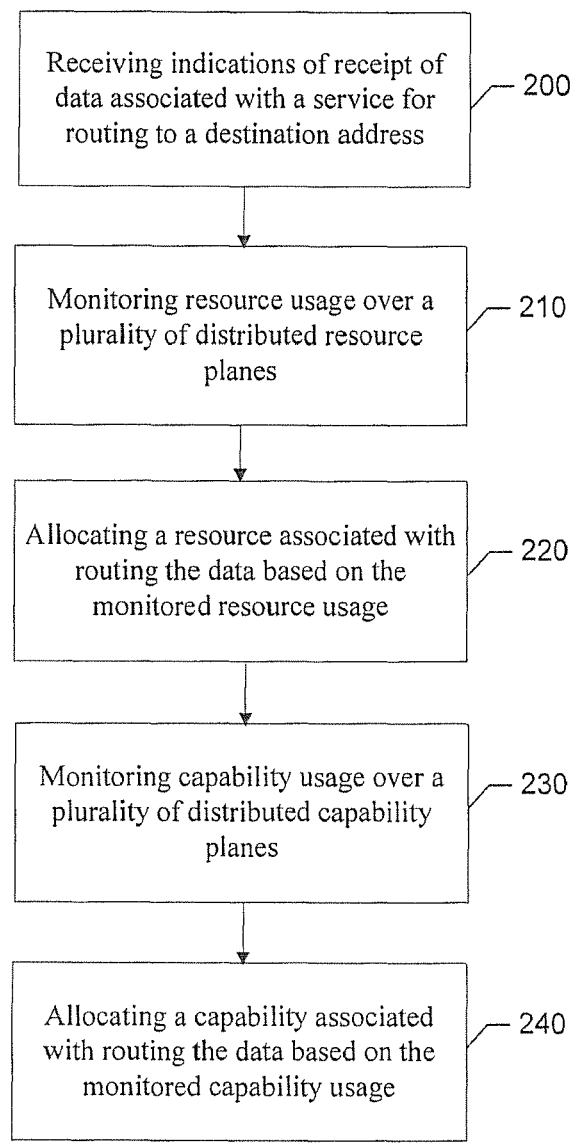
FIG. 4 is a flow chart of a method according to an exemplary embodiment of the present invention.

FIG. 4 is a flow chart of a method of providing a distributed router architecture according to an exemplary embodiment. In this regard, the method may include receiving indications of receipt of data associated with a service for routing to a destination address at operation 200. At operation 210, resource usage may be monitored over a plurality of distributed resource planes. The resource associated with routing the data may be allocated based on the monitored resource usage at operation 220. In an optional operation 230, capability usage may be monitored over a plurality of distributed capability planes. Thereafter, a capability associated with routing the data may be allocated based on the monitored capability usage in optional operation 240.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. A method comprising:
    monitoring resource usage in each one of a plurality of geographically distinct planes;
    allocating a resource associated with data based on the monitored resource usage;
    receiving indications of receipt of the data associated with a service for routing to a destination address;
    monitoring capability usage over a plurality of distributed capability planes; and
    allocating a capability associated with routing the data based on the monitored capability usage.

2. The method of claim 1, wherein each resource of each of the geographically distinct planes is interconnected with a corresponding resource of another geographically distinct resource plane to form a resource grid.

3. The method of claim 1, wherein the allocating the resource further comprises dynamically adjusting resource allocation responsive to changes in resource usage.

4. The method of claim 1, wherein allocating the resource based upon predetermined rules.

5. The method of claim 4, wherein the rules include a priority associated with the data.

6. The method of claim 1, wherein allocating the resource further comprising selecting a capability from a common capabilities plane and an application from an application and services plane corresponding to the resource and associated with the service.

7. A system comprising:
    a resource availability element configured to monitor resource usage in each one of a plurality of geographically distinct resource planes;
    a process element configured to allocate a resource associated with data based on the monitored resource usage, wherein the process element is further configured to receive indications of receipt of the data, the data associated with a service for routing to a destination address; and
    a capability broker configured to monitor capability usage over a plurality of distributed capability planes and allocate a capability associated with routing the data based on the monitored capability usage.

8. The system of claim 7, wherein each resource of each of the geographically distinct resource planes is interconnected with a corresponding resource of another geographically distinct resource plane to form a resource grid.

9. The system of claim 7, wherein the processing element is further configured to select a capability from a common capabilities plane and an application from an application and services plane corresponding to the resource and associated with the service.

10. A computer readable medium tangibly embodying computer-executable instructions for causing a processor to perform operations comprising:
    receiving indications of receipt of data;
    monitoring resource usage over a plurality of distributed resource planes;
    allocating a resource associated with the data based on the monitored resource usage;
    monitoring capability usage over a plurality of capability planes; and
    allocating a capability associated with the data based on the monitored capability usage.

11. The medium of claim 10, wherein the monitoring resource usage includes monitoring the resource usage in each one of a plurality of geographically distinct planes.

12. The medium of claim 10, wherein the data is associated with a service for routing to a destination address.

13. The medium of claim 12, wherein the monitoring capability usage includes monitoring the capability usage over a plurality of geographically distributed capability planes.

14. The medium of claim 13, wherein the geographically distributed capability planes each include a set of capability elements configured to perform at least one function corresponding to the service.

15. The medium of claim 13, wherein at least a subset of the geographically distributed capability planes are located at different geographic locations.

16. The medium of claim 10, wherein at least one of the capability planes includes at least two of a routing protocol element, a port monitoring element, an admission control element and a forwarding element.

* * * * *